United States Patent [19]
Moan et al.

[11] Patent Number: 5,458,540
[45] Date of Patent: Oct. 17, 1995

[54] FLOW CONTROL VALVE FOR A CONTINUOUSLY VARIABLE TRANSMISSION CONTROL SYSTEM

[75] Inventors: Richard D. Moan; Thomas T. Tibbles, both of Livonia, Mich.

[73] Assignee: Ford Motor Company, Dearborn, Mich.

[21] Appl. No.: 28,017

[22] Filed: Mar. 8, 1993

[51] Int. Cl.⁶ .................................................. F16H 59/00
[52] U.S. Cl. ............................................................ 474/28
[58] Field of Search ................................... 474/18, 28, 69

[56] References Cited

U.S. PATENT DOCUMENTS

| | | | |
|---|---|---|---|
| H398 | 1/1988 | Lemieux et al. | |
| 4,116,080 | 9/1978 | Berens | |
| 4,475,416 | 10/1984 | Underwood | 474/18 |
| 4,515,040 | 5/1985 | Takeuchi et al. | |
| 4,543,077 | 9/1985 | Yamamuro et al. | |
| 4,546,673 | 10/1985 | Shigematsu et al. | |
| 4,583,423 | 4/1986 | Hahne | |
| 4,653,004 | 3/1987 | Osanai et al. | |
| 4,658,360 | 4/1987 | Osanai et al. | |
| 4,663,990 | 5/1987 | Itoh et al. | |
| 4,683,779 | 8/1987 | Osanai et al. | |
| 4,734,082 | 3/1988 | Tezuka | 474/28 |
| 4,736,301 | 4/1988 | Osanai | |
| 4,767,384 | 8/1988 | Moan | 474/28 |
| 4,823,267 | 4/1989 | Kumura | 364/424.1 |
| 4,827,805 | 5/1989 | Moan | 74/867 |
| 4,829,433 | 5/1989 | Nakano et al. | 364/424.1 |
| 4,876,920 | 10/1989 | Eichenberger | 74/689 |
| 5,247,960 | 11/1993 | Sato | 474/28 |

FOREIGN PATENT DOCUMENTS

| | | | |
|---|---|---|---|
| 176743 | 7/1988 | Japan | 474/28 |
| 41252 | 2/1991 | Japan | 474/28 |

*Primary Examiner*—Timothy S. Thorpe
*Attorney, Agent, or Firm*—Frank G. McKenzie; Roger L. May

[57] ABSTRACT

A control system for a continuously variable sheave drive having a driving sheave assembly (124) and a driven sheave assembly (126) connected drivably by a torque transfer belt or chain (144), each sheave assembly being comprised of a pair of friction drive sheave portions (128/130 and 178/180) that are axially adjustable, one with respect to the other, to establish varying pitch radii, each sheave assembly having a fluid pressure operated servo with a pressure chamber (164/212) supplied with control pressure from a pressure source, distribution of control pressure to one servo assembly effecting a pitch radius adjustment thereby changing the overall drive ratio, control pressure distribution to the other sheave assembly resulting in a clamping force, and valve means for limiting the rate of delivery of pressurized fluid to the ratio controlling sheave assembly (124) so that control pressure will not fall below a desired value.

6 Claims, 11 Drawing Sheets

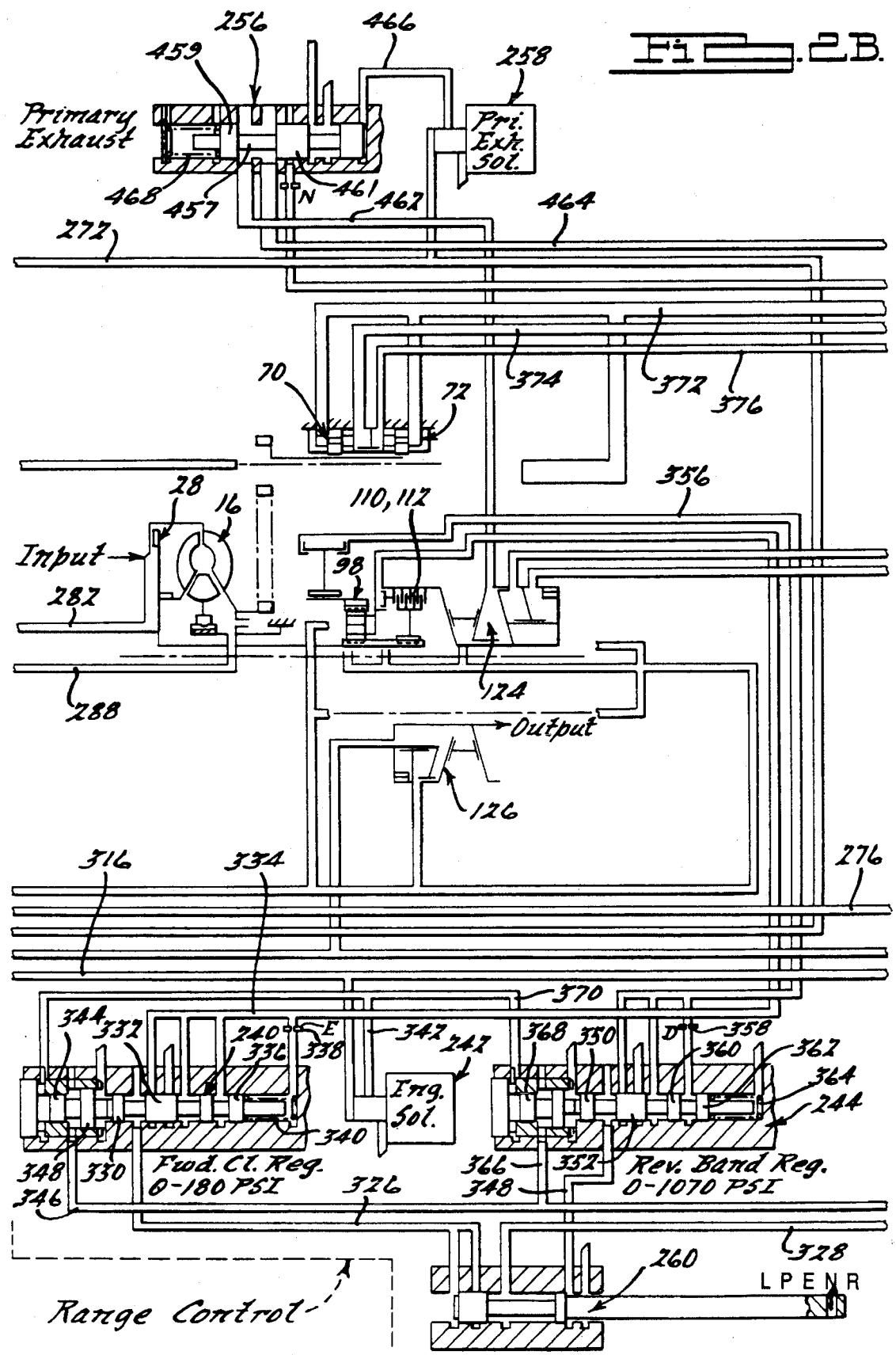

SOLENOID LOGIC

| STALL SOLENOID VFS(NH) | SHEAVE SOLENOID VFS(NH) | ENGAGEMENT SOLENOID VFS(NH) | SHEAVE CAPACITY | FWD/REV CAPACITY | COMMENTS |
|---|---|---|---|---|---|
| OFF | OFF | OFF | FULL STALL | FULL STALL | LIMP HOME/MAX LINE |
| OFF | OFF | ON | FULL STALL | FULL ENG. | |
| OFF | ON | OFF | FULL ENG. | FULL ENG. | |
| OFF | ON | ON | FULL ENG. | FULL ENG. | |
| ON | OFF | OFF | FULL ENG. | FULL ENG. | |
| ON | OFF | ON | FULL ENG. | ZERO | CRUISE |
| ON | ON | OFF | MIN. LINE | MIN. LINE | |
| ON | ON | ON | MIN. LINE | ZERO | "N" IDLE/ENGAGE |

| CONV. CLUTCH SOLENOID VFS(NL) | CONV. CLUTCH CAPACITY | COMMENTS |
|---|---|---|
| OFF | ZERO | LIMP HOME/OPEN |
| ON | MAX AVAILABLE | LOCKED UP/CRUISE |

| RATIO SOLENOID VFS(NH) | RATIO | COMMENTS |
|---|---|---|
| OFF | OD | LIMP HOME/CRUISE |
| ON | UD | DRIVEAWAY |

| PRIMARY EXH SOLENOID ON/OFF(NL) | PRIMARY SHEAVE | COAST PUMP CLUTCH | COMMENTS |
|---|---|---|---|
| OFF | LINE | OFF | LIMP HOME |
| ON | EXHAUST | ON | BRAKE COAST ONLY |

| LUBE SOLENOID ON/OFF(NL) | PRIMARY & SECONDARY SHAFT LUBE | COMMENTS |
|---|---|---|
| OFF | ON | LIMP HOME |
| ON | OFF | IDLE ONLY |

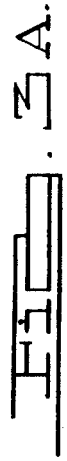

FIG. 3A.

| ORIFICE SIZES | | |
|---|---|---|
| DESIGNATION LETTER | DIAM. (MM) | FUNCTION |
| A | 1.0 | DAMP SHEAVE REGULATOR |
| B | 1.0 | DAMP CONVERTER REGULATOR |
| C | 1.0 | DAMP SHEAVE FLOW LIMIT |
| D | 1.0 | DAMP REVERSE BAND REGULATOR |
| E | 1.0 | DAMP FORWARD CLUTCH REGULATOR |
| F | 1.0 | DAMP VFS SOLENOID REGULATOR |
| G | 1.0 | DAMP ON/OFF SOLENOID REGULATOR |
| H | 1.5 | SETS COOLER FLOW WHEN CONVERTER IS LOCKED |
| J | 1.0 | DAMP CONVERTER CLUTCH REGULATOR |
| K | 1.5 | RESTRICT CONV. REG. TO CONV. CLU. REG. VALVE |
| M | 1.5 | FEED TO CONV. WHEN CONV. REG. IS CLOSED |

FIG. 3B.

FLOW CONTROL VALVE FOR A CONTINUOUSLY VARIABLE TRANSMISSION CONTROL SYSTEM

TECHNICAL FIELD

This invention relates to control systems for continuously variable transmissions in an automotive vehicle driveline.

BACKGROUND OF THE INVENTION

Our invention comprises improvements in a continuously variable transmission design of the kind disclosed in U.S. Pat. No. 4,767,384. Other continuously variable transmission designs capable of embodying the improvements of my invention are shown in U.S. Pat. Nos. 4,827,805 and 4,836,049, as well as copending patent application Ser. No. 29,019, filed Mar. 8, 1993 by Thomas Tibbles, one of the inventors of the present invention, and by Pramod Jain. The copending application and the three U.S. patents identified above are assigned to the assignee of our present invention.

It is common practice in the design of a continuously variable transmission (CVT) for automotive vehicles to match the ratio changing characteristics of the infinitely variable transmission with the speed/torque characteristics of a throttle-controlled internal combustion engine for the vehicle so that the powertrain package comprising the engine and the transmission will operate, under normal driving conditions, so that the engine and the transmission will achieve minimum brake specific fuel consumption for each engine throttle setting. This requires a continuous change in the ratio of the transmission as the throttle position and the engine speed change to meet the driving demands of the driveline. The adjustment in the transmission ratio is achieved by using primary driving and secondary driven sheave assemblies having relatively axially adjustable friction drive portions with juxtaposed cone surfaces. As the cone surfaces of each sheave assembly are adjusted, one with respect to the other, the position of a drive belt or chain located between the friction surfaces will change in a radial direction so that the overall ratio of the transmission will vary from a minimum underdrive ratio to a maximum overdrive ratio.

Adjustment of the friction drive portions of each sheave assembly of the CVT transmission disclosed in the copending application identified above is achieved by a primary fluid pressure operated servo comprising a piston located within a pressure cylinder. By varying the effective pressure on the primary sheave assembly servo, the ratio of the drive can be changed. The clamping pressure on each sheave assembly can be controlled by maintaining an effective clamping pressure on the secondary sheave assembly by a secondary fluid pressure operated servo.

The control pressure that is distributed to the working chambers of the primary servo and the secondary servo of the CVT transmission of the copending application identified above is established by a control system that includes a pump driven by the engine. A regulator valve in the control system for the transmission achieves the desired working pressure in the sheave assemblies so that slippage of the belt or chain will not occur. The control system also includes a ratio control valve arrangement for controlling pressure distributed to the primary sheave assembly to effect adjustment of the spacing between the sheave portions of the primary sheave assembly, thereby changing the overall ratio of the transmission.

BRIEF DESCRIPTION OF THE INVENTION

In a preferred embodiment of our invention, the main pressure chambers for the primary and secondary sheave assemblies are in fluid communication so that an increase in the volume of the main pressure chamber for the primary sheave assembly, upon a command for an increase in the drive ratio, will be accompanied by a corresponding decrease in the volume of the main pressure chamber for the secondary servo. The net volume of fluid for both main pressure chambers will remain substantially unchanged, except for leakage. Thus, the fluid volume that must be delivered to the primary sheave assembly to achieve the change in ratio, as the conical sheave portions are adjusted, is a minimum. That minimum volume is the volume that must be delivered to either an upshift pressure chamber or a downshift pressure chamber. If the ratio change should occur at a rapid rate, however, the fluid supplied to the primary sheave assembly must be delivered at a high rate. This requires a pump having a large flow capacity to supply the fluid flow needs of the primary sheave assembly.

If the fluid flow demand exceeds the capacity of the pump to supply the fluid flow necessary to effect a rapid ratio change, there will be a tendency for the chain or belt to slip because the pump then will not be capable of maintaining full pressure in the control pressure chamber for each servo. This slipping condition is unacceptable because of the possibility that the slippage would cause rapid deterioration of the chain or belt and the sheave frictional surfaces.

The improved control system of our invention avoids this slipping condition by limiting the flow of pressurized fluid to the primary sheave assembly during rapid ratio changes so that the pressure level that is maintained by the pump will not fall below approximately 80% of the commanded pressure level at any given pump speed for which the pump is designed. This will ensure that the belt or chain will not slip during ratio changes, particularly during a rapid downshift of the transmission, as the vehicle operator makes a demand for an increase in torque for accelerating the vehicle or for overcoming increased road resistance due to an increasing slope in the road surface or due to a change in the condition of the road surface.

It is common practice in the design of infinitely variable transmissions of this kind to provide a safety factor of about 1.3 so that the line pressure is about 30% higher than the pressure needed at any given speed to avoid slippage of the belt or chain. This safety factor is not a guarantee, however, that the belt or chain will not slip during a ratio change because a ratio change, as explained previously, will require a transient increase in fluid delivery from the pump. If the pump is incapable of delivering increased flow during that transient condition, the line pressure will drop. The present invention is intended to reduce the flow to the ratio control valve if the actual supply of oil to the sheave drops line pressure below 80% of the commanded value.

A sheave flow limit valve is under the control of a sheave solenoid valve which, in turn, is responsive to a solenoid driver signal of a microprocessor included in the control valve system. The microprocessor responds to sensor signal values from an engine speed sensor, an engine throttle angle position sensor, a mass air flow sensor for the engine intake manifold, the drive range selector position selected by the vehicle operator, the primary sheave speed, the secondary sheave speed, and oil temperature as well as other driveline variables. The output pressure from the sheave solenoid valve actuates the sheave flow limit valve as well as a sheave pressure regulator valve.

BRIEF DESCRIPTION OF THE DRAWINGS

FIGS. 2A, 2B and 2C, taken together, show a control valve system for controlling the transmission of FIGS. 1A, 1B and 1C;

FIG. 3A is a chart showing the solenoid logic for the control solenoids that form a part of the control valve system of FIGS. 2A, 2B and 2C;

FIG. 3B is a chart that describes the functions of the orifices found in the control system of FIGS. 2A, 2B and 2C.

PARTICULAR DESCRIPTION OF THE INVENTION

The Sheave Drive

Figure 1A:
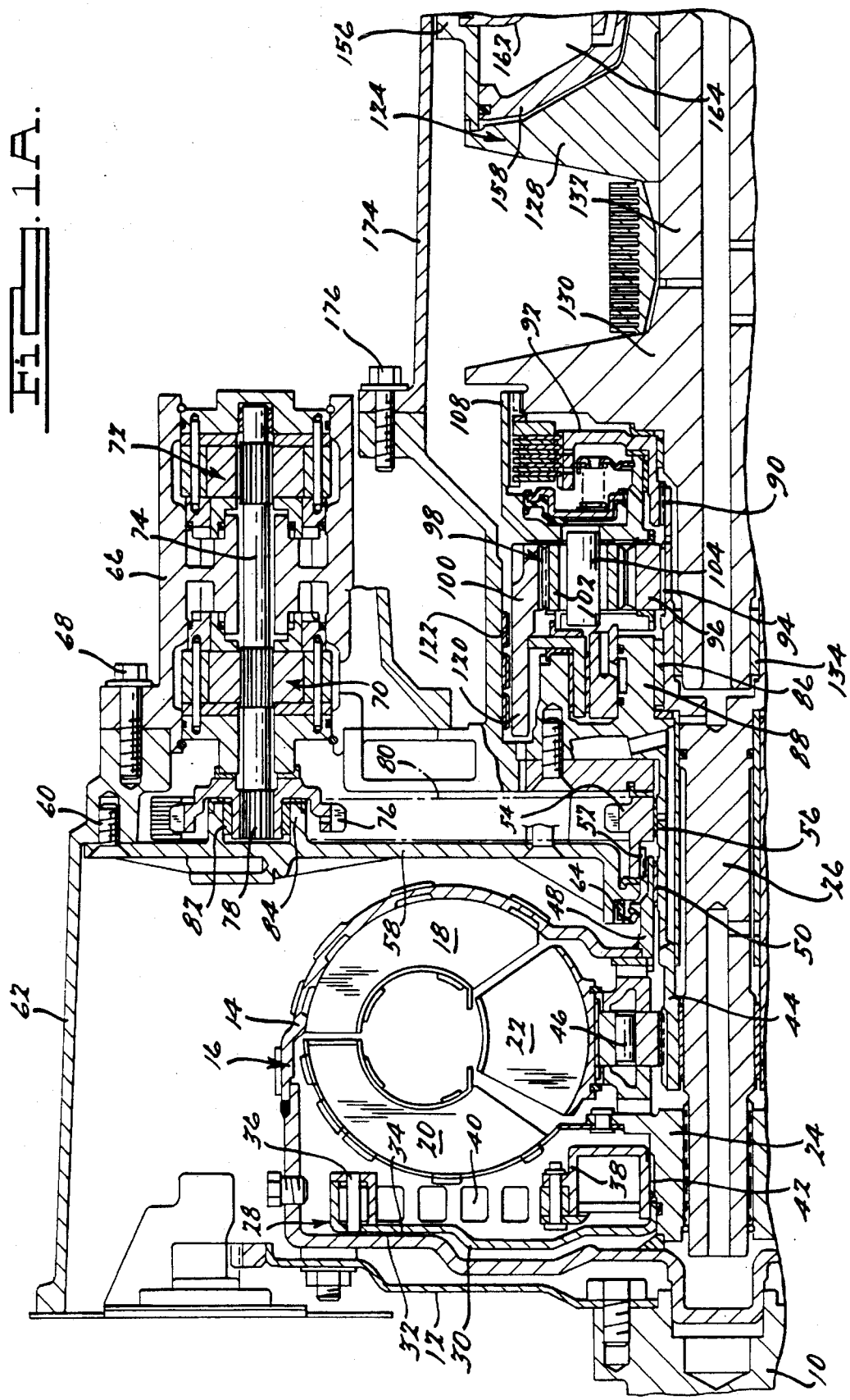
FIGS. 1A, 1B and 1C, taken together, show an infinitely variable transmission comprising a hydrokinetic torque converter, forward and reverse gearing, and primary and secondary sheave assemblies.
Figure 4A:
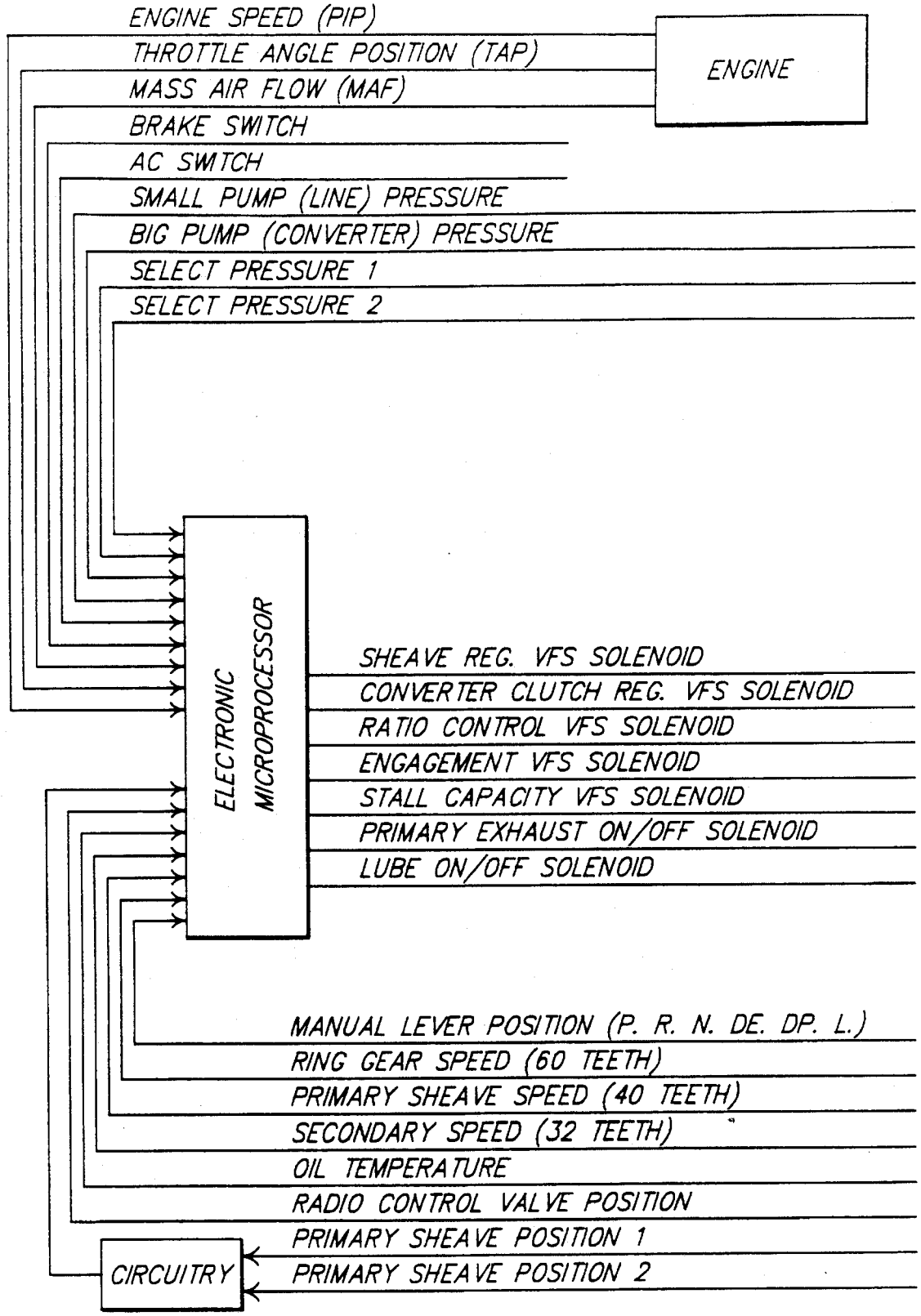
FIGS. 4A and 4B show a schematic control overview of the electronic microprocessor, the electrohydraulic controls, the engine and the infinitely variable transmission assembly.
Figure 4B:
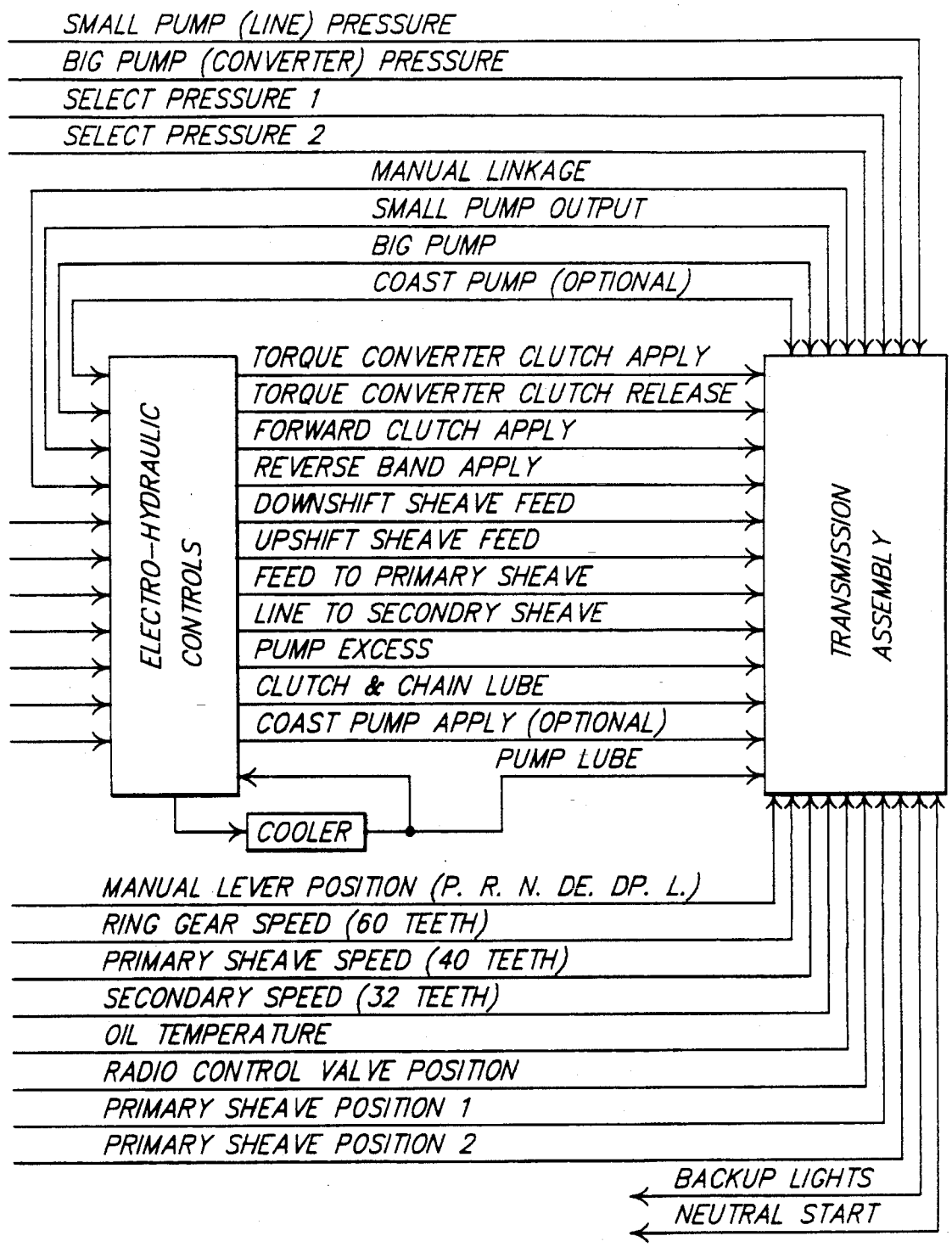

In FIG. 1A, numeral 10 designates the end of the crankshaft of an internal combustion engine, which is illustrated in the control overview of FIG. 4 in block diagram form. Crankshaft 10 is connected by drive plate 12 to the impeller housing 14 of a hydrokinetic torque converter 16. The impeller housing 14 has blades 18 forming an impeller assembly that is in fluid flow relationship with respect to a bladed turbine 20 and a bladed stator 22. The turbine 20 has a hub 24 which is splined to turbine shaft 26.

Torque converter bypass clutch assembly 28 comprises a clutch piston plate 30 having an annular friction surface 32 situated directly adjacent an annular friction surface 34 on the interior of the impeller shell 14. The clutch plate is connected at its outer periphery 36 to a damper hub 38 by means of a resilient damper element 40. The hub 38 is splined at 42 to the turbine hub 24.

Shaft 26 extends through a stationary sleeve shaft 44 for the stator assembly 22. The bladed portion of the stator assembly 22 is connected to the stator sleeve shaft 44 through an overrunning brake 46.

Impeller housing 14 has a hub 48 which is journalled by bushing 50 on stationary sleeve shaft 44. Hub 48 is drivably splined at 52 to pump drive sprocket 54, which also is journalled on the stationary sleeve shaft 44, bushing 56 being provided for this purpose.

A housing separator wall 58 is secured by bolts 60 to transmission housing portion 62, which encloses the torque converter 16. A fluid seal assembly 64 surrounding the impeller hub 48 is located in a central opening in the housing wall 58.

Pump housing 66 is joined to the transmission housing 62 by bolts 68. It contains two positive displacement pumps identified generally by reference numerals 70 and 72. The capacity of the pump 70 is larger than the capacity of pump 72. Each pump comprises a positive displacement pumping element that is splined drivably to a common pump drive shaft 74. A driven sprocket 76 for the pump drive is splined at 78 to the driveshaft 74. A drive chain shown at 80 drivably connects drive sprocket 54 to the driven sprocket 76. Sprocket 76 is journalled by bearing 82 in a bearing pocket 84 formed in the housing wall 58.

Turbine shaft 26 is journalled by bearing 86 in a bearing support 88, which forms a part of the stationary sleeve shaft 44.

Turbine shaft 26 is splined at 90 to clutch element 92 and is splined at 94 to sun gear 96, the latter forming a torque input element of a forward and reverse gear unit 98.

Gear unit 98 comprises also ring gear 100, which meshes with a first set of planet pinions 102 supported on carrier 104. Pinions 102 mesh with pinions 106, shown in FIG. 1B, also supported on the carrier 104. Pinions 106 drivably engage sun gear 96.

A clutch drum 108 is connected directly to the carrier 104. It carries externally splined clutch friction discs 110, which frictionally engage internally splined discs 112 carried by the clutch hub 92 as seen in FIGS. 1A and 1B.

A pressure actuated piston 114 situated in annular cylinder 116 engages the clutch friction discs 110 and 112 when pressure is admitted to the working chamber defined by the cylinder 116 and the piston 114.

Ring gear 100 forms a part of a brake drum 120, which is surrounded by friction reverse brake band 122.

Figure 1B:
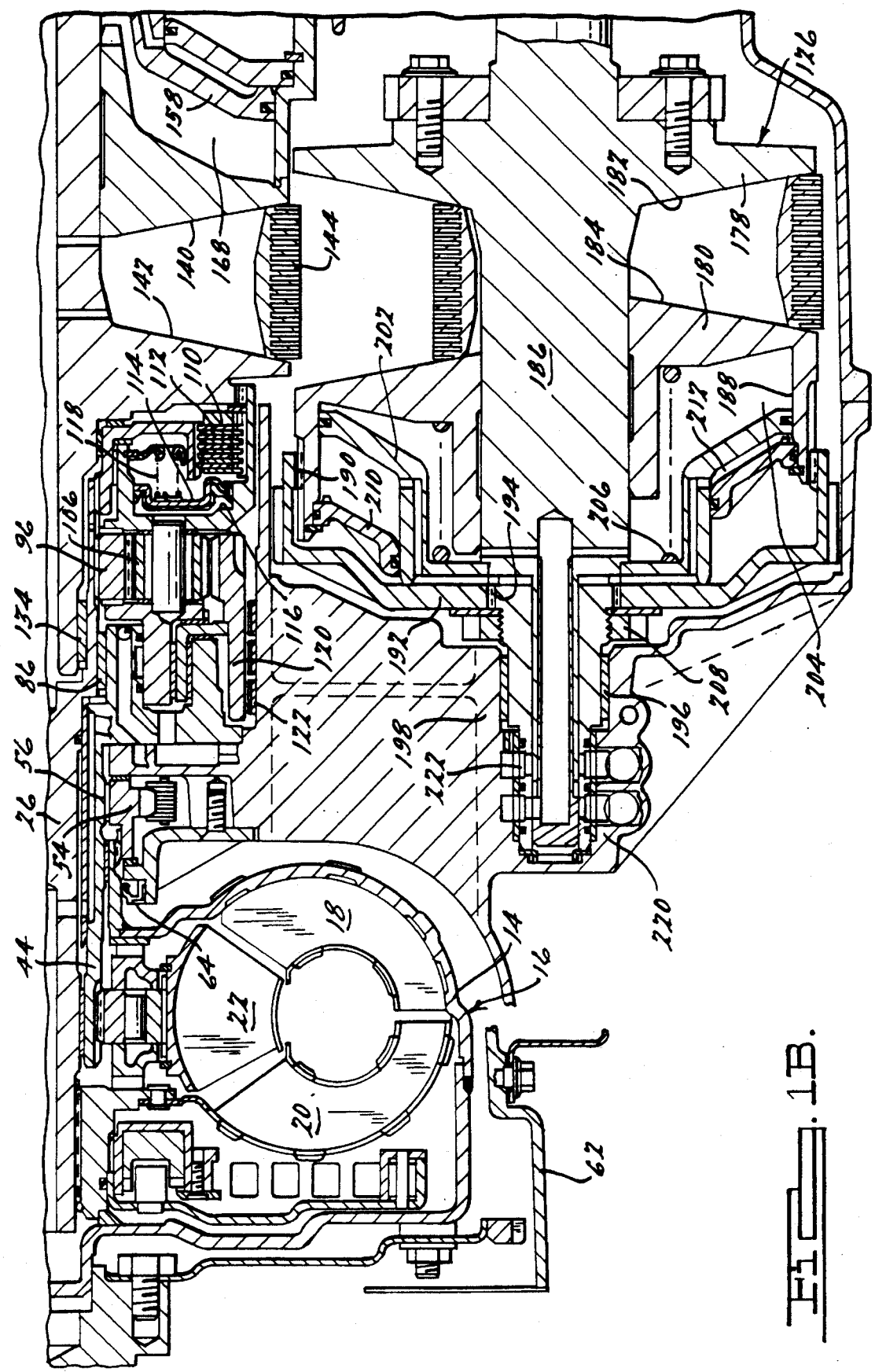

FIGS. 1A and 1B show the sheave drive which comprises a primary sheave assembly 124 and a secondary sheave assembly 126. Sheave assembly 124 comprises an adjustable sheave disc 128 and a fixed sheave disc 130. Sheave driveshaft 132 forms a part of the sheave disc 130. It is journalled at one end by bearing 134. It is journalled at the other end by bearing 136 located in a bearing opening formed in transmission housing end wall 138, as seen in FIG. 1B.

Sheave disc 128 has a conical friction drive surface 140. Fixed disc 130 has a companion conical friction drive surface 142. A friction drive belt or chain 144 is situated between the conical friction drive surfaces and is arranged in frictional driving relationship with respect to the surfaces 140 and 142.

The shaft 132 is threaded at 146 to accommodate a clamping nut 148, which secures cylinder member 150 on the shaft 132. Member 150 is provided with an internal opening which receives the shaft 132. It is connected drivably to the shaft 132 by drive spline 152.

The outer periphery of the member 150 has a sliding key connection 154 with cylinder 156 which is secured to the outer margin of the adjustable sheave disc 128. The sliding key connection 154 accommodates axial movement of the cylinder 156 relative to the member 150, although relative rotary movement is prevented.

A piston member 158 surrounds the shaft 132. It is provided with a hub 160 received in a central opening in piston member 162 which is secured at its outer margin to the interior of the cylinder 156. The piston members 158 and 162 cooperate to define an underdrive or downshift pressure chamber 164. Member 150 and piston member 162 cooperate to define an upshift pressure chamber 166. The member 158 and the sheave disc 128 cooperate to define a primary sheave pressure chamber 168.

A thrust washer 170 is secured between the right-hand end of the shaft 132 and an end plate 172 on the transmission housing portion 174, the latter being secured to housing 62 by bolts 176 as seen in FIG. 1A.

Fluid pressure is distributed to the pressure chambers 168, 166 and 164 through a manifold assembly at the right-hand end of the shaft 132. This manifold assembly is defined by concentric pressure distributor tubes which establish annular fluid flow passages communicating with the pressure chambers. These passages are connected to pressure distributor grooves, one of which is shown at 176 located in the housing portion 174.

The secondary sheave assembly 126 comprises a conical friction sheave disc 178. A companion friction sheave disc 180 is axially movable relative to the disc 178. Each is formed with a conical friction drive surface as seen at 182 and 184, respectively. The drive belt or chain 144 registers with the conical friction surfaces 182 and 184.

Friction means disc 180 is axially movable on driven sheave shaft 186. It is provided with a cylinder portion 188, which is keyed at 190 to driven member 192. Member 192 is splined at 194 to shaft 186. The left end of the shaft 186 is journalled by bearing 196 in a bearing opening formed in a bearing pocket portion 198 of the housing 62. An annular piston member 210 is secured to the cylinder portion 188 and moves with the friction sheave disc 180. Sheave disc 180 cooperates with piston member 202, which in turn cooperates with piston member 210 to define a secondary sheave pressure chamber 212.

A compression spring 206 located in the cylinder portion 188 urges pressure disc 180 toward an underdrive position. A lock nut 208, which is threaded on the shaft 186, holds the member 192 axially fast against a shoulder on the shaft 186.

Pressure chamber 212 is defined by the piston members 210 and 202. Centrifugal pressure developed in the pressure chamber 212 is substantially balanced by the counteracting centrifugal pressure developed in pressure chamber 204.

Figure 1C:
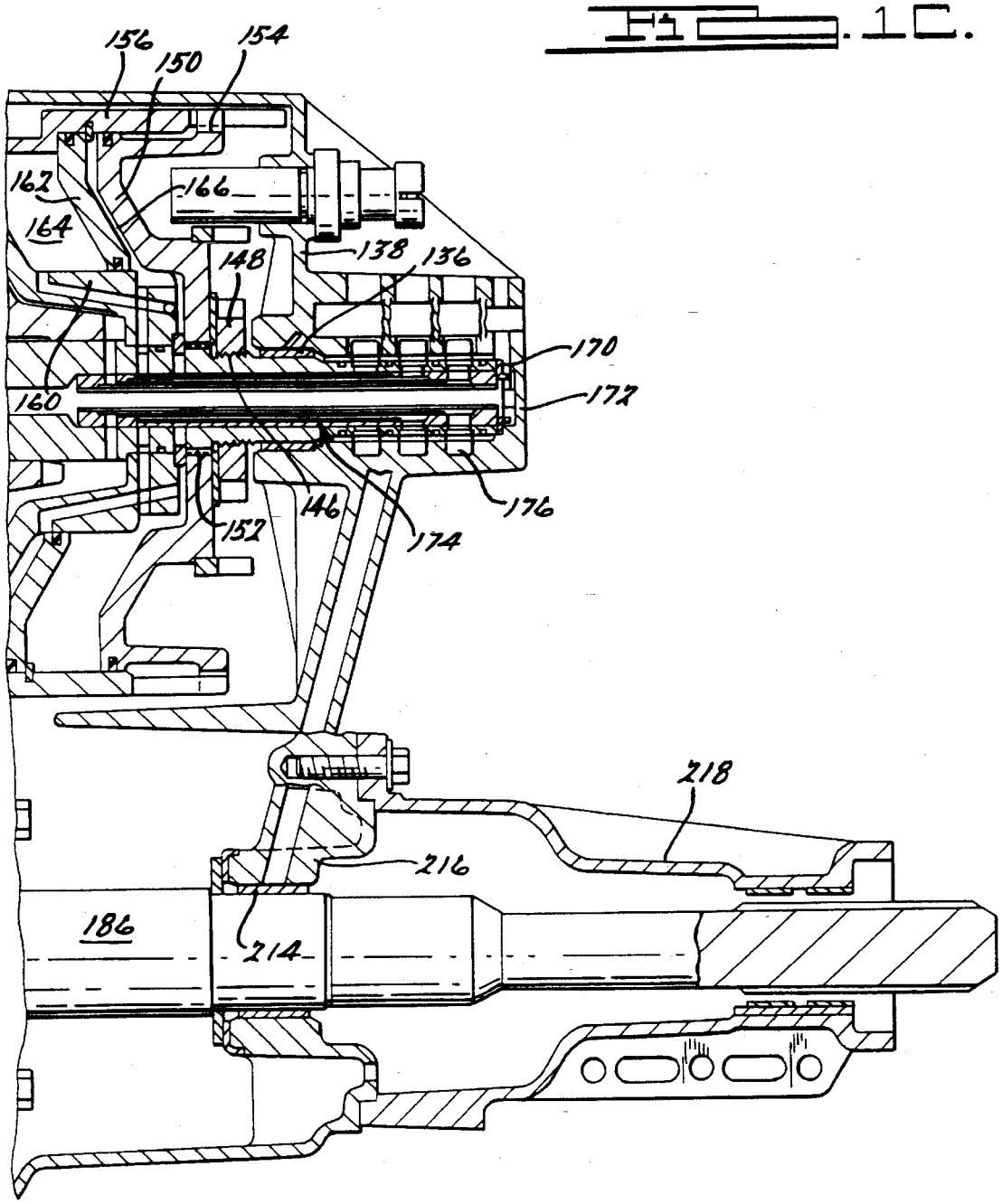

The right-hand end of the shaft 186, as seen in FIG. 1C, is journalled by bearing 214 located in a bearing opening formed in bearing support wall 216. An output shaft extension housing 218 surrounds the right-hand end of the shaft 186. It is adapted to be connected to a driveshaft for the vehicle traction wheels through a universal joint assembly, not shown.

The gearing 98 is capable of establishing a forward drive and a reverse drive depending upon whether the brake band 122 is applied or the clutch, comprising discs 110 and 112, is applied. When the clutch is applied, sun gear 96 becomes connected to the carrier 104 so a one-to-one driving relationship exists between turbine shaft 26 and primary sheave shaft 132. If the clutch is released and the brake band 122 is applied, ring gear 100 acts as a reaction member. Driven torque delivered to the sun gear 96 will drive the carrier 104 in a reverse direction as the ring gear acts as a reaction member. Reverse motion of the carrier is transferred to the primary sheave assembly through the driving connection provided by clutch drum 108.

Clamping pressure in pressure chamber 212 will prevent slippage of the belt or chain with respect to the sheaves. That same clamping pressure also acts on the primary sheave since the pressure chamber 168 is in fluid communication with the primary sheave pressure chamber 212. During a ratio change from underdrive to overdrive, the volume of fluid in chamber 168 increases and the volume of fluid in the chamber 212 decreases. Conversely, a ratio change toward the underdrive position of the sheave assemblies will result in a decrease in the volume of fluid in the pressure chamber 168 and a corresponding increase in the volume of fluid in the pressure chamber 212. No substantial net change in volume occurs.

To achieve a shifting of the primary sheave toward the downshift position, pressure chamber 164 is pressurized. To achieve a shift of the primary sheave assembly toward the upshift position, pressure chamber 166 is pressurized. The control of pressurized fluid for the upshift chamber and the downshift chamber will be explained with reference to the valve diagram of FIGS. 2A, 2B and 2C.

The left-hand end of the shaft 186 is received in a recess formed in a manifold portion 220 of the housing 62. Pressure distributor tubing 222 establishes fluid communication between pressure supply and exhaust porting formed in the manifold 220 and the exhaust and pressure sides of the piston plate 200 for the secondary sheave assembly.

The Control Valves

Figure 2A:
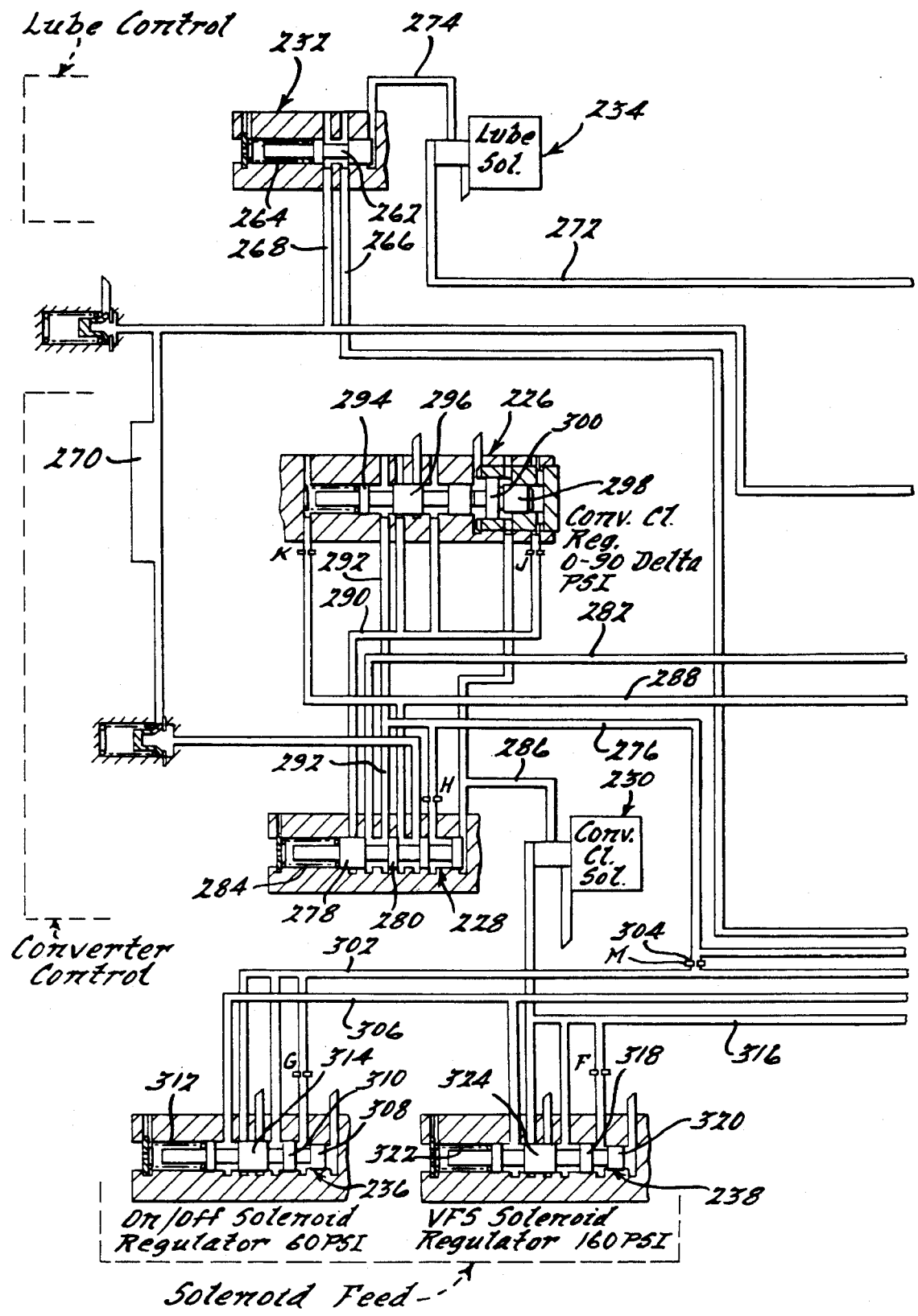
Figure 2C:
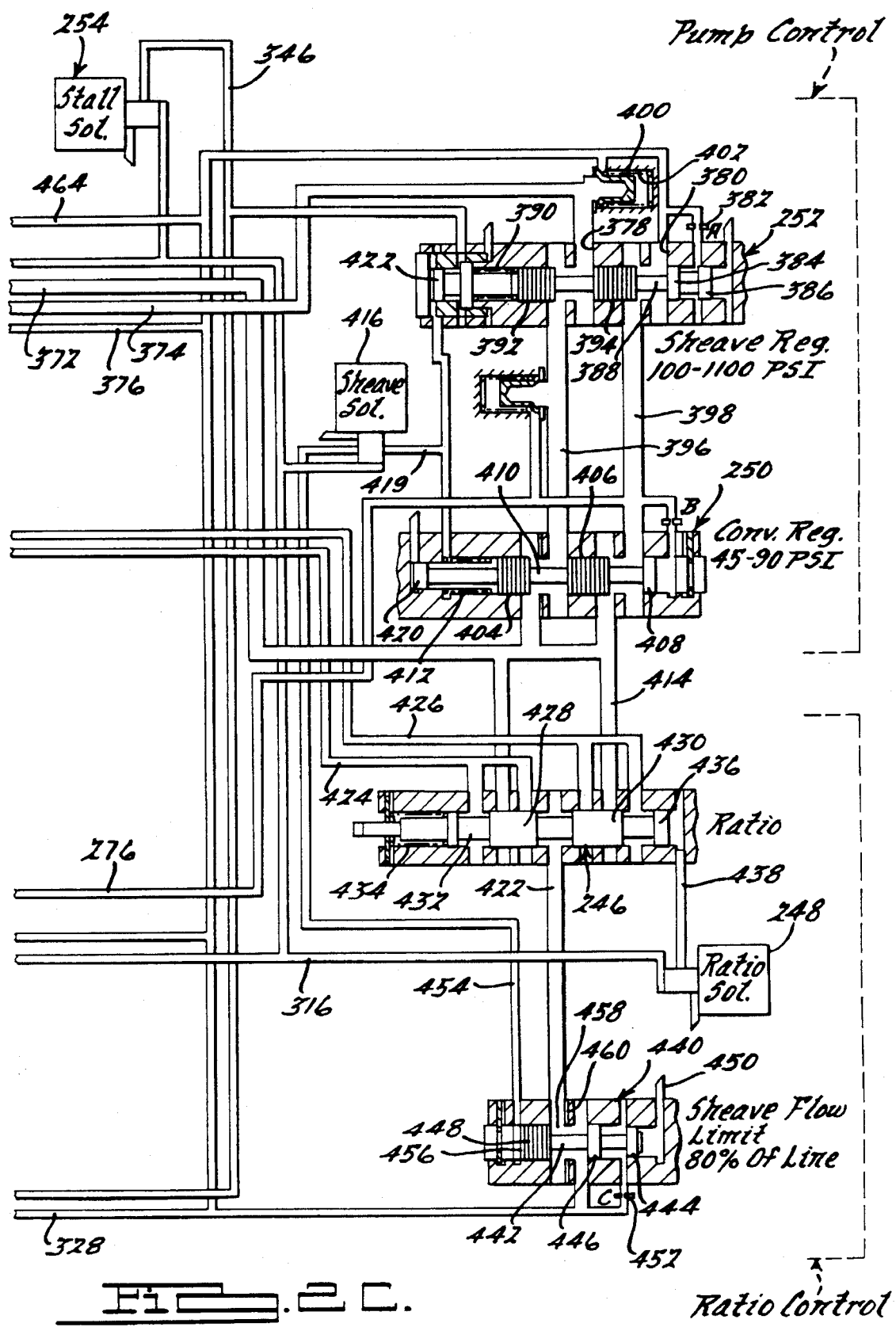

The valve control system of FIGS. 2A, 2B and 2C comprises a lube control, a converter control, a solenoid feed control, a range control, a ratio control and a pump control. These separate regions of the valve system have been indicated by appropriate legends in FIGS. 2A, 2B and 2C. The converter control comprises a converter clutch regulator valve 226, a converter clutch control valve 228 and a variable force (VFS) solenoid valve 230. The lube control comprises an on/off type lube flow control valve 232 and an on/off lube solenoid valve control 234.

The solenoid feed circuit comprises an on/off solenoid regulator valve 236 and a variable force solenoid (VFS) regulator valve 238.

The range control portion of the circuit comprises a forward clutch regulator valve 240, a VFS engagement solenoid valve 242 and a reverse band regulator valve 244.

The ratio control portion of the circuit includes a ratio valve 246 and a ratio solenoid valve (VFS) 248. The pump control includes a converter regulator valve 250 and a sheave regulator valve 252.

The stall solenoid valve, which is a VFS solenoid valve, is shown at 254 and a primary exhaust valve is shown at 256. An on/off primary exhaust solenoid valve 258 controls the valve 256.

A conventional drive range selector valve or manual valve is shown in FIG. 2B at 260. This forms a part of the range control valve system. It can be adjusted to various positions; i.e., a low range position "L", a drive range performance position "P", a drive range economy position "E", a neutral position "N" and a reverse position "R". In the position shown in FIG. 2B, the manual valve is in the neutral position.

The lube control valve 232 comprises a valve spool 262. It normally is urged in a right-hand direction by valve spring 264 so that communication is established between lube pressure line 266 and lube pressure line 268, the latter extending to the cooler 270.

On/off lube solenoid valve 234 comprises a solenoid pressure supply passage 272 and an output signal passage 274. The passage 274 normally is at low pressure or zero pressure. When the valve 234 is actuated, pressure is distributed from the solenoid supply pressure passage 272 to the right-hand end of the valve spool 262 which shifts the valve in a left-hand direction, thereby shutting off the lubrication flow to the cooler. This occurs when the engine is idling, thus preventing unneeded fluid flow and avoiding a drain-down of the valve body sump when the engine idles.

The bypass clutch 28 is engaged by circuit pressure in the toroidal circuit for the torque converter 16. When a pressure differential exists across the lock-up clutch piston plate 30 due to high pressure in the toroidal circuit and a lower pressure in the clutch release chamber defined by the piston plate 30 and the adjacent impeller shell housing, the bypass clutch is frictionally engaged. The pressure in the converter bypass clutch release chamber behind the bypass clutch plate 30 is controlled by the converter clutch regulator valve 226. Valve 226 is supplied with a regulated converter pressure from regulator valve 250 through passage 276.

The converter flow control valve 228 has valve lands 278 and 280 that establish communication between passage 276 and passage 282, which extends to the converter clutch release chamber. In FIG. 2A, the valve 226 is shown in a position corresponding to the converter bypass clutch "off" position. It is urged in that position by valve spring 284. When the bypass clutch is "on", the variable force solenoid output pressure in passage 286 will shift the valve 228 in a left-hand direction. Regulated converter pressure in passage 276 then is distributed through the valve 228 to passage 288, thereby pressurizing the toroidal circuit. Pressure in the converter clutch release chamber, as mentioned above, is regulated by the valve 226 as regulated pressure in passage 290 is distributed through the valve 228 to the passage 292.

Supply pressure, which is a regulated output pressure from the valve 250, is distributed through passage 276 and through passage 292 to the valve 226. The degree of communication between passage 290 and 292 is controlled by lands 294 and 296 on the valve 226. Feedback pressure in passage 290 is distributed to the right-hand end of the valve 226 where it acts on land 298.

The variable force solenoid output pressure in passage 286 acts on a differential area of lands 298 and 300 so that the regulated output pressure in passage 290, which is distributed to the release side of the bypass clutch, depends upon the magnitude of the pressure developed by the variable force solenoid 230.

The on/off solenoids, one of which is shown at 234, are supplied with pressure through passage 302. Converter regulator supply passage 276 communicates with passage 302 through flow control orifice 304 so that the converter will continue to be supplied with fluid even when the converter regulator valve is closed. Line pressure is distributed to the on/off solenoid regulator 236 through passage 306. Valve 236 establishes a pressure of about 60 psi in passage 302. The pressure in passage 302 acts on a differential area of lands 308 and 310, which opposes the force acting on the valve 236 by valve spring 312. The pressure regulating action for the valve 236 is established as the degree of communication between passage 306 and passage 302 is controlled by land 314.

The variable force solenoid valves are supplied with pressure from the variable force solenoid regulator valve 238. As in the case of the valve 236, the valve 238 is supplied with line pressure from passage 306. Regulated pressure in passage 316 acts on the differential area of lands 318 and 320 establishing a force that opposes the force of valve spring 322. Land 324 controls the degree of communication between the line pressure passage 306 and the variable force solenoid regulated pressure passage 316. The variable force solenoid regulator 238 regulates the pressure in passage 316 at a value of about 160 psi.

When the manual valve or range valve 260 is moved to a forward drive range position (L, P or E), line pressure is distributed to passage 326, which extends to the forward clutch regulator valve 240, seen in FIG. 2B. Line pressure is supplied to the range selector valve 260 through passage 328, which communicates with line pressure passage 326 described previously. The supply pressure for the forward clutch regulator valve in passage 326 is distributed between lands 330 and 332. Land 332 controls the degree of communication between passage 326 and forward clutch feed passage 334. Feedback pressure is distributed to the right-hand side of land 336 through damper orifice 338. The feedback pressure supplements the force of valve spring 340. The calibration of the forward clutch regulator valve determines the magnitude of the pressure in the forward clutch feed passage 334.

Variable force solenoid 242, which is supplied with feed pressure from passage 316, determines the magnitude of the pressure in passage 342. That pressure acts on the left side of land 344 of the forward clutch regulator valve 240. The variable force solenoid thus is able to control the rate of engagement of the forward clutch.

If the converter is stalled, extra clutch capacity is required. Thus, an auxiliary boost pressure is distributed through passage 346 to the differential area of lands 344 and 347. The pressure in passage 346 is obtained from the stall solenoid 254 shown in FIG. 2C.

The stall solenoid is a variable force solenoid that is supplied with feed pressure from passage 316. This increases the capacity of the clutch when the converter is stalled because of the resulting increase in the regulated output pressure of the forward clutch regulator valve.

The reverse band regulator valve 244 controls the engagement of the reverse brake to cause the brake band to engage smoothly. It receives line pressure through passage 348 when the manual valve or the range selector valve 260 is shifted in a right-hand direction to the "R" position, thus establishing communication between passage 328 and passage 348. Line pressure then is delivered through passage 348 to the valve 244 between lands 350 and 352.

Land 352 controls the degree of communication between passage 348 and passage 356, which extends to the reverse brake band. Feedback pressure from passage 356 is distributed through damper orifice 358 to the differential area of lands 360 and 362. Valve spring 364 normally urges the reverse band regulator valve in a left-hand direction.

Stall solenoid 254 delivers a boost pressure to the reverse band regulator valve through passage 366. In this respect, the boost feature for the reverse band regulator valve corresponds to the boost feature for the forward clutch regulator valve.

Engagement of the reverse band is controlled by the variable force solenoid engagement valve 242. The output of that VFS valve is distributed to the left-hand side of the land 368 through passage 370.

As seen in FIG. 2B, large pump 70 and small pump 72 have a common pump inlet passage 372. The discharge or high pressure passage for the large pump 70 is shown at 374. The corresponding high pressure discharge passage for small pump 72 is shown at 376.

Large pump high pressure passage 374 communicates with the inlet port 378 of the sheave regulator valve 252. Small pump high pressure passage 376 communicates with supply port 380 for the sheave regulator valve 252.

Valve 252 functions as a main regulator valve. Pressure in port 380 is distributed through orifice 382, which is a damper orifice, to the space between lands 384 and 386. These lands have a differential area, so the pressure in port 380 will create a force on the regulator valve spool 388 that is opposed by valve spring 390.

The pressure at port 378 communicates with the regulator valve 252 between lands 392 and 394. Converter regulator valve supply passage 396 communicates with the port 378. The degree of communication between port 378 and passage 396 is controlled by the land 392. When the spool 388 is positioned to the right, communication between port 378 and passage 396 is interrupted.

Land 394 controls the degree of communication between port 380 and converter regulator supply passage 398. High pressure passage 374 for the large pump communicates with the high pressure passage 376 for the small pump through a one-way flow check valve 400, which normally is closed by valve spring 402.

As the speed of the engine increases, both pumps are used to satisfy the load requirements of the regulator valve 250. When the flow developed by the small pump is sufficient to supply the needs of the control system, the land 392 will open communication between port 378 and passage 396. At that time, the pressure requirements are satisfied only by the pressurized fluid in passage 376, which is regulated by the land 394. When the pressurized flow requirement can be satisfied by the small pump, land 394 will uncover passage 398, thereby dumping pressurized fluid into passage 398.

The converter regulator 250 acts in a manner similar to the operation of valve 252. Valve 250 includes valve lands 404, 406 and 408 located on a valve spool 410, which is biased in a right-hand direction, as seen in FIG. 2C, by valve spring 412. Land 406 controls the degree of communication between passage 398 and passage 414, which leads to the common pump inlet passage 372. Thus, the pressure in passage 398 is a regulated pressure that is distributed to passage 276 for the converter clutch regulator.

The sheave solenoid valve, which is a variable force solenoid valve, is shown at 416 in FIG. 2C. As in the case of the other variable force solenoid valves, it is supplied with pressure in passage 316. That pressure is regulated by the variable force solenoid regulator 238, as explained previously, The variable force solenoid valve 416 responds to a control signal from the microprocessor, which infers engine torque as a function of input torque, converter torque ratio and belt ratio. The output from the variable force solenoid valve 416 is distributed to passage 418. The pressure in passage 418 can vary between 100 psi to 550 psi.

The pressure in passage 418 acts on the differential area of lands 404 and a smaller land 420 on the regulator valve 250. This establishes a force on the spool 410 which supplements the force of the spring 412. Thus, the output pressure regulated by the regulator 250 depends upon the magnitude of the input torque, torque converter ratio and belt ratio. The pressure in passage 418 also acts on valve land 422 for the regulator valve 252, thus creating a force that complements the force of the valve spring 390 and increases the regulated pressure of valve 252 when an increase in torque is sensed based upon the input torque, the converter ratio and the belt ratio.

The stall solenoid 254 controls the line pressure when the converter is stalled. This will increase the forward clutch capacity and the reverse clutch capacity. The presence of the valve 254 in the system makes it unnecessary for the variable force solenoid valve 416 to have a high gain difference for providing an unusual increase in the clutch and brake capacity required when the converter is stalled. This simplifies the design of the solenoid valve 416.

The ratio valve 246 functions to control distribution of pressurized fluid from ratio valve supply passage 422 to the upshift pressure distributor passage 424 and to the downshift pressure distributor passage 426. Passage 424 communicates with the upshift or overdrive pressure chamber 166, shown in FIG. 1C; and passage 426 communicates with the downshift or underdrive pressure chamber 164, shown in FIG. 1C. Communication between passage 422 and each of the passages 424 and 426 is controlled by valve land 428 and valve land 430, respectively. These lands are formed on valve spool 432, which is urged in a right-hand direction by valve spring 434. A pressure force acts on the right-hand side of the valve land 436, which opposes the force of the spring 434. That force is produced by the ratio solenoid valve 248, which is a variable force solenoid supplied with pressure from the common feed passage 316 for the variable force solenoids. The output pressure of the ratio solenoid valve 248 is distributed to the ratio valve through passage 438.

The ratio solenoid valve 248 is under the control of the microprocessor. It responds to an output signal of the microprocessor to change ratio in an upshift direction or in a downshift direction, depending upon the operating conditions that are sensed by the sensors that provide input signals to the microprocessor.

Figure 2D:
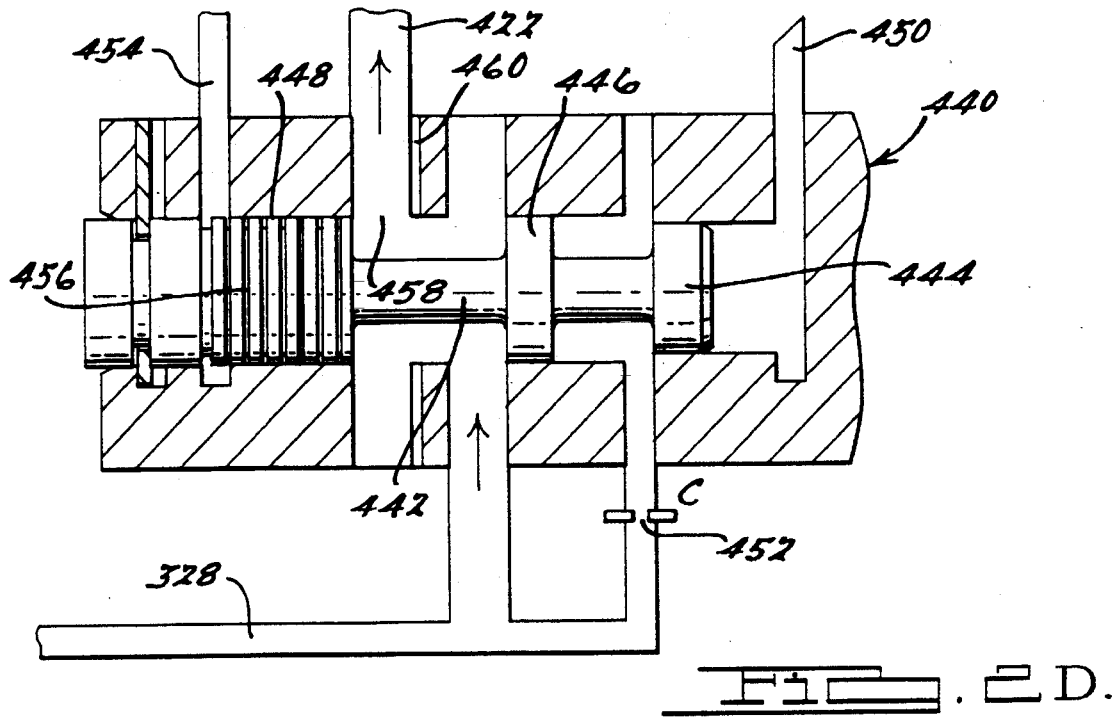
FIG. 2D is a detailed view of the sheave flow limit valve that forms a part of the valve system of FIGS. 2A, 2B and 2C.

The sheave flow limit valve is shown in FIG. 2C at 440. It is supplied with fluid from passage 328. It is on the upstream side of the ratio valve 246 and is adapted to control communication between supply passage 328 and supply passage 422 for the ratio valve. Passage 328 is supplied with line pressure whenever the manual valve is in a forward drive range position or a reverse position. FIG. 2D shows an enlarged view of the sheave flow limit valve.

The flow limit valve comprises a valve spool 442, which has spaced valve lands 444, 446 and 448. The right-hand side of the land 444 is exhausted through port 450. Lands 444 and 446 have a differential area that is supplied with fluid from passage 328 through damper orifice 452.

The left-hand side of the land 448 is subjected to the output pressure of the sheave solenoid valve 416. Pressure from the valve 416 is delivered to the sheave flow limit valve through passage 454.

The sheave flow limit valve regulates pressure in the sheaves at 80% of line pressure. If the pressure in passage 454 that is commanded by the microprocessor is such that the value of the line pressure is greater than 80% of the commanded value, the sheave flow limit valve will permit free communication between passage 328 and passage 422. If the line pressure should fall below 80% of the commanded value, the valve 440 will begin to regulate so that 80% of the line pressure will be maintained, As best seen in FIG. 2D, valve land 448 has centering grooves 456, which help to reduce valve friction. Further, the exit port 458, which communicates with the passage 422, is provided with "V" notches 460, which provide valve stability when the valve is regulating. The notches 460 will provide for a gradual closing off of the port 458 as the valve land 456 shifts in a right-hand direction upon a loss of line pressure.

The solenoid logic is summarized in FIG. 3A. The operating states of the stall solenoid, the shift solenoid and the engagement solenoid will produce various sheave capacities. This will result also in various forward and reverse clutch capacities as summarized. Further, the converter clutch logic and the ratio solenoid logic is summarized in FIG. 3A.

The primary exhaust valve 256 controls communication between the line pressure chamber for the primary servo and the line pressure chamber for the secondary servo. Upon a ratio change toward the overdrive condition, the line pressure chamber for the primary sheave increases in volume. This of course corresponds to a decrease in volume for the line pressure chamber for the secondary sheave.

Valve 256 comprises a valve spool 457 having spaced lands 459 and 461, which control communication between passages 462 and 464. These respectively communicate with the primary sheave line pressure chamber and the secondary sheave line pressure chamber. Valve 256 is shown in FIG. 2B in its normal position. The primary exhaust solenoid valve 258, which is an on/off solenoid, communicates with on/off solenoid supply pressure passage 272 and distributes a signal to passage 466. The force developed by the signal in passage 466 is opposed by valve spring 468. The valve 258 exhausts the primary sheave pressure chamber during a hard vehicle braking situation.

FIG. 3B summarizes the functions of the various orifices, which are designated by letters A–M. These letters are indicated also in the circuit drawings of FIGS. 2A, 2b and 2C. Orifices A–G are merely damper orifices that are used to establish valve stability. Orifice H sets the cooler flow when the converter is locked. Orifice J is another damper orifice for the converter clutch regulator. Orifice K restricts the flow from the converter regulator to the converter clutch regulator valve. Orifice M provides a feed to the converter regulator when the converter regulator valve is closed.

FIGS. 4A and 4D show a control overview including the microprocessor, the electrohydraulic controls, the transmission and the throttle-controlled internal combustion engine. The input signals to the microprocessor have been labeled, as are the output signals delivered from the microprocessor to the electrohydraulic controls, including the VFS and on/off solenoids. The signals from the electrohydraulic controls to the transmission assembly have been indicated by functional statements in FIG. 4. The microprocessor has a memory that stores a control algorithm and a central processor unit that acts on the input signals in accordance with the algorithm to develop the microprocessor output signals.

Figure 2E:
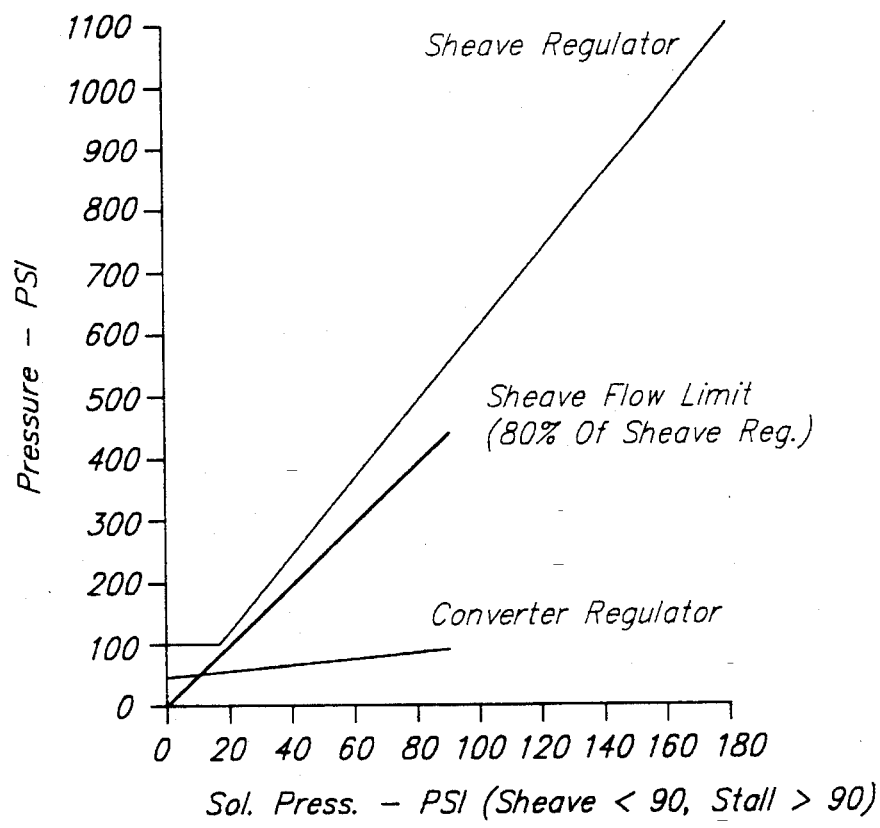
FIG. 2E is a graph showing the pump regulator characteristics for the control system of FIGS. 2A, 2B and 2C.

FIG. 2E shows the relationship between solenoid pressure and sheave pressure, as well as sheave flow limit pressure and the converter regulator pressure. As indicated, the sheave flow limit pressure is 80% of the sheave regulator pressure at any given solenoid pressure. When the sheave regulator pressure exceeds 90 psi, a converter stall condition is indicated. At that time, the converter stall signal developed by solenoid 254 acts on the sheave regulator, as well as on the reverse band regulator valve and the forward clutch regulator valve. The sheave flow limit valve and the converter regulator valve, however, do not communicate with the output of the valve 254. Thus, the solenoid pressure limit on the abscissa of the chart of FIG. 2E is 90 psi, which represents the end of the plot for the sheave flow limit valve and the converter regulator valve.

Having described the preferred embodiment of our invention, what we claim and desire to secure by U.S. Letters Patent is:

1. A control system for an infinitely variable ratio transmission in a vehicle driveline having an engined said transmission having driving and driven sheave assemblies and a frictional torque transfer drive belt disposed between said sheave assemblies, said driving sheave assembly being drivably connected to said engine, said control system having a primary sheave servo means for adjusting the effective pitch radius of said sheave assemblies and a secondary sheave servo means for establishing a belt clamping load, each servo means including a fluid pressure chamber, said pressure chambers being defined by relatively movable portions of said sheave assemblies;

a fluid pressure source, a fluid pressure distributor valve circuit connecting said pressure source to each servo means, a ratio valve means in said circuit for controlling distribution of fluid to said primary sheave servo means; and a sheave flow limit valve means in said valve circuit for limiting the rate of fluid delivery to said primary sheave servo means whereby the maximum rate of fluid delivery to said primary sheave servo means is less than the fluid flow capacity of said pressure source during a transmission ratio change.

2. A control valve system for an infinitely variable ratio transmission in a vehicle driveline having an engine, said transmission having driving and driven sheave assemblies and a frictional torque transfer drive belt disposed between said sheave assemblies, said driving sheave assembly being drivably connected to said engine, said control system having a primary sheave servo means for adjusting the effective pitch radius of said sheave assemblies and a secondary sheave servo means for establishing a belt clamping load, each servo means including a fluid pressure chamber, said pressure chamber being defined by relatively movable portions of said sheave assemblies;

said pressure chambers being in fluid communication whereby an increase in volume of the pressure chamber for one servo means is accompanied by a corresponding decrease in volume of the pressure chamber for the other servo means;

a fluid pressure source, a fluid pressure distributor valve circuit connecting said pressure source to each servo means;

said relatively movable portions of said primary sheave servo means defining also a ratio upshift pressure chamber and a ratio downshift pressure chamber whereby introduction of fluid under pressure to said upshift pressure chamber causes an increase in pitch radius of said driving sheave assembly and introduction of fluid under pressure to said downshift pressure chamber causes a decrease in pitch radius of said driving sheave assembly;

a ratio valve means in said circuit for controlling distribution of fluid to said upshift and downshift pressure chambers; and a sheave flow limit valve means in said valve circuit for limiting the rate of fluid delivery to said upshift and downshift pressure chambers whereby the maximum rate of fluid delivery to said upshift and downshift chambers is less than the fluid flow capacity of said pressure source during a transmission ratio change.

3. The combination as set forth in claim 1 wherein said control system includes an electronic microprocessor controller, means for sensing operating conditions including engine torque, engine speed, driven speed of said driven sheave assembly and transmission ratio, said microprocessor communicating with each of said sensing means and having a central processor unit adapted to respond to said operating conditions to develop output signals in accordance with a stored algorithm;

a sheave solenoid valve means responsive to an output signal from said microprocessor that depends upon the magnitude of said sensed operating conditions for actuating said sheave flow limit valve means and said ratio valve means, said controller commanding a fluid pressure level for said primary servo means in excess of the pressure level required for torque delivery through said belt without slippage, said sheave flow limit valve being adapted to restrict the flow of fluid to said primary servo means when said pressure level commanded by said controller during a ratio change is less than a predetermined percentage of the commanded pressure level.

4. The combination as set forth in claim 2 wherein said control system includes an electronic microprocessor controller, means for sensing operating conditions including engine torque, engine speed, driven speed of said driven sheave assembly and transmission ratio, said microprocessor communicating with each of said sensing means and having a central processor unit adapted to respond to said operating conditions to develop output signals in accordance with a stored algorithm;

a sheave solenoid valve means responsive to an output signal from said microprocessor that depends upon the magnitude of said sensed operating conditions for actuating said sheave flow limit valve means and said ratio valve means, said controller commanding a fluid pressure level for said upshift and downshift chambers that establishes torque delivery through said belt without slippage, said sheave flow limit valve being adapted to restrict the flow of fluid to said primary servo means when said pressure level commanded by said controller during a ratio change is less than a predetermined percentage of the commanded pressure level.

5. The combination as set forth in claim 4 wherein said predetermined percentage is about 80 percent of said commanded pressure level.

6. The combination as set forth in claim 5 wherein said predetermined percentage is about 80 percent of said commanded pressure level.

* * * * *